United States Patent
Gao et al.

(10) Patent No.: US 12,413,827 B2
(45) Date of Patent: Sep. 9, 2025

(54) METHOD AND APPARATUS FOR ACQUIRING PROP INFORMATION, DEVICE, AND COMPUTER READABLE STORAGE MEDIUM

(71) Applicant: NETEASE (HANGZHOU) NETWORK CO., LTD., Zhejiang (CN)

(72) Inventors: Xiang Gao, Zhejiang (CN); Jing Sun, Zhejiang (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 0 days.

(21) Appl. No.: 17/755,723

(22) PCT Filed: Mar. 19, 2020

(86) PCT No.: PCT/CN2020/080262
§ 371 (c)(1),
(2) Date: May 6, 2022

(87) PCT Pub. No.: WO2021/088297
PCT Pub. Date: May 14, 2021

(65) Prior Publication Data
US 2022/0394356 A1 Dec. 8, 2022

(30) Foreign Application Priority Data
Nov. 7, 2019 (CN) .......................... 201911079561.4

(51) Int. Cl.
*H04N 21/81* (2011.01)
*H04N 21/2187* (2011.01)
(Continued)

(52) U.S. Cl.
CPC ..... *H04N 21/8133* (2013.01); *H04N 21/2187* (2013.01); *H04N 21/2542* (2013.01); *H04N 21/47815* (2013.01); *H04N 21/637* (2013.01)

(58) Field of Classification Search
CPC ........... H04N 21/8133; H04N 21/2187; H04N 21/2542; H04N 21/47815; H04N 21/637
See application file for complete search history.

(56) References Cited

U.S. PATENT DOCUMENTS 9,352,217 B1 * 5/2016 Curtis ..................... A63F 13/67
2006/0238503 A1 10/2006 Smith
(Continued)

FOREIGN PATENT DOCUMENTS

| CN | 101079047 A | 11/2007 |
|---|---|---|
| CN | 104361075 A | 2/2015 |

(Continued)

OTHER PUBLICATIONS

The 1st Office Action dated Jul. 24, 2020 for CN patent application No. 201911079561.4.
(Continued)

*Primary Examiner* — Randy A Flynn
(74) *Attorney, Agent, or Firm* — Patterson + Sheridan LLP

(57) ABSTRACT

The present disclosure provides a method and apparatus for acquiring prop information, a device, and a computer readable storage medium. The method comprises: receiving, by a transaction platform, information on game props during a live broadcast of a game, and generating an identification code for accessing the information on game props; and transmitting, by the transaction platform, the identification code to a live broadcast platform, so as to enable the live broadcast platform to display the identification code in a live broadcast screen.

18 Claims, 4 Drawing Sheets

(51) Int. Cl.
*H04N 21/254* (2011.01)
*H04N 21/478* (2011.01)
*H04N 21/637* (2011.01)

(56) References Cited

U.S. PATENT DOCUMENTS

| | | | | |
|---|---|---|---|---|
| 2015/0024852 | A1* | 1/2015 | Pacey | A63F 13/58 |
| | | | | 463/43 |
| 2015/0058870 | A1* | 2/2015 | Khanna | H04N 21/2542 |
| | | | | 725/1 |
| 2015/0157942 | A1* | 6/2015 | Ikeda | A63F 13/69 |
| | | | | 463/31 |
| 2015/0189384 | A1* | 7/2015 | Du | H04N 21/8583 |
| | | | | 725/32 |
| 2017/0001112 | A1* | 1/2017 | Gilmore | A63F 13/85 |
| 2017/0113143 | A1* | 4/2017 | Marr | A63F 13/355 |
| 2017/0228781 | A1 | 8/2017 | Conte | |
| 2018/0131976 | A1* | 5/2018 | Zabelin | H04N 21/812 |
| 2018/0144396 | A1* | 5/2018 | Yin | G06Q 30/0643 |
| 2018/0152764 | A1 | 5/2018 | Taylor et al. | |
| 2019/0118086 | A1* | 4/2019 | Gentile | A63F 13/86 |

FOREIGN PATENT DOCUMENTS

| | | |
|---|---|---|
| CN | 104519412 A | 4/2015 |
| CN | 106991108 A | 7/2017 |
| CN | 107750005 A | 3/2018 |
| CN | 110060135 A | 7/2019 |
| CN | 110139121 A | 8/2019 |
| CN | 110784732 A | 2/2020 |

OTHER PUBLICATIONS

The International Search Report issued on Jul. 29, 2020 by the WIPO for PCT International Application No. PCT/CN2020/080262.

* cited by examiner

METHOD AND APPARATUS FOR ACQUIRING PROP INFORMATION, DEVICE, AND COMPUTER READABLE STORAGE MEDIUM

CROSS-REFERENCE

The present application is a National Stage of International Application No. PCT/CN2020/080262, filed on Mar. 19, 2020, which claims the benefit of priority to Chinese Application No. 201911079561.4, filed on Nov. 7, 2019, both of which are incorporated by reference herein in their entireties for all purposes.

TECHNICAL FIELD

The present disclosure relates to computer technology, and in particular, to a method, apparatus, device for acquiring prop information and a computer-readable storage medium.

BACKGROUND

At present, webcasting technology is very mature. An anchor can do a webcast through a terminal, and an audience can watch a live video through the terminal.

In the related art, a live broadcast method for game events is provided. A competition process of players participated in the game can be broadcast live. During the process of watching the game, the audience can also pay attention to props used by the players in addition the competition progress.

SUMMARY

The present disclosure provides a method, device, device for acquiring prop information, and a computer-readable storage medium.

A first aspect of the present disclosure provides a method for acquiring prop information, including:
  receiving, by a transaction platform, information on game props during a live broadcast of a game, and generating an identification code for accessing the information on game props; and
  transmitting, by the transaction platform, the identification code to a live broadcast platform, so as to cause the live broadcast platform to display the identification code in a live broadcast screen.

Another aspect of the present disclosure provides an electronic device, including a processor and a memory for storing a computer program,
  where the processor is configured to call and run the computer program stored in the memory to perform operations of:
  receiving information on game props during a live broadcast of a game, and generating an identification code for accessing the information on game props;
  transmitting the identification code to a live broadcast platform, so as to cause the live broadcast platform to display the identification code in a live broadcast screen.

Yet another aspect of the present disclosure provides a computer-readable storage medium on which computer programs are stored, the computer programs, when executed by a processor, implement the method for acquiring prop information as described in the first aspect.

DETAILED DESCRIPTION

Figure 1:
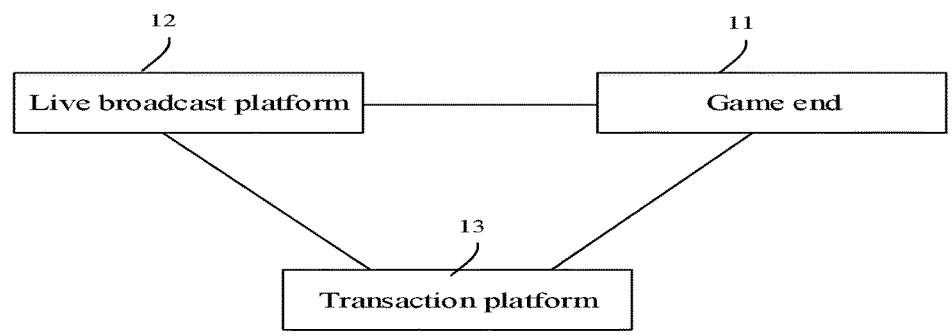
FIG. 1 is a system architecture diagram of some embodiments of the present disclosure.

FIG. 1 is a system architecture diagram of some embodiments of the present disclosure.

As shown in FIG. 1, a system architecture provided in the embodiment includes a game end 11. The game end 11 may further include a client and a server. The anchor can operate the client to play the game. If the anchor participates in a game competition, there may be multiple clients, and each contestant can play the competitive game through different clients. The game end 11 may also include a game server. Through the interaction between the clients and the server, multiple clients can play games in the same game scene.

The system architecture may further include a live broadcast platform 12, and the live broadcast platform 12 can obtain a video of the game process and the video is broadcast live through the network. Audience can watch the live video through live clients connected to the live platform. The audience can watch the live video in real time, or watch the video in a playback mode.

Specifically, the system architecture may further include a transaction platform 13, and the transaction platform 13 may be used to realize the transaction of game props. For example, a user may purchase weapons, equipment, etc. in the transaction platform 13.

Further, an audience end (not shown in the figure) may also be included in the system architecture, and the audience end may be connected to the live broadcast platform 12 to play the live video.

At present, if the audience is interested in the props used in the game while watching the live video of the game, they can learn about information about the props only through the introduction in the game video or by observing the props used in the live video, which is very inconvenient.

In solutions provided by the embodiments of the present disclosure, an identification code can be generated according to game prop information in the live broadcast of the game, and then the identification code is displayed on the live broadcast screen, so that the audience can directly obtain prop information by scanning the identification code while watching the live video, which is easy to operate.

Figure 2:
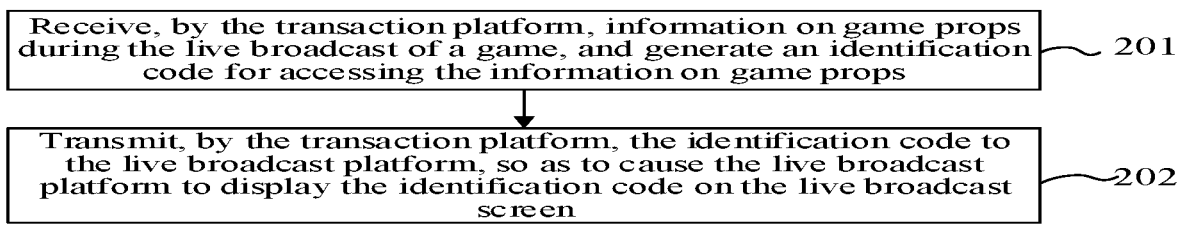
FIG. 2 is a flowchart of a method for acquiring prop information according to some embodiments of the present disclosure.

FIG. 2 is a flowchart of a method for acquiring prop information according to some embodiments of the present disclosure;

As shown in FIG. 2, the method for acquiring prop information provided by the embodiments includes steps described below.

In step 201, information on game props during a live broadcast of a game is received by the transaction platform, and an identification code for accessing the information on game props is generated.

The method provided in the embodiments may be applied to the system architecture shown in FIG. 1.

Specifically, when doing a live game broadcast, the anchor needs to operate a game client in the anchor terminal. During the live broadcast, the game client can interact with the game server. For example, the anchor operates the game client to control a character to jump, then the game client can transmit a corresponding command to the game server through the network, and the server can control the action of the character according to the command. Moreover, the server can feedback a result of the action to the game client, and also feedback the result to clients of other characters in the same application scenario.

Further, the game server may acquire information on props used by the anchor during the game. For example, after the anchor logs in to the account, the game server may acquire information on game props equipped by the game character corresponding to the login account.

In practical application, the game server can transmit the acquired information on game props to the transaction platform, so that the transaction platform can receive the information on game props.

In an embodiment, the anchor who needs to perform live broadcast can be determined according to the account, so that the information on game props of the anchor is acquired, without acquiring information of each player's game props. For example, if players A and B need to perform live game broadcast, the game server can acquire information on game props corresponding to players A and B.

The transaction platform can generate an identification code after receiving the information on game props, and by scanning the identification code, a page for displaying the information on game props can be entered. For example, the transaction platform may generate a first identification code according to the game prop used by anchor A, and may also generate a second identification code according to the game prop used by anchor B. Information on multiple game props may be displayed on a page, or only information on one game prop may be displayed on the page, which is not limited in the embodiments. Audience watching the live game broadcast can quickly acquire information about the props used by the anchor by scanning the identification code.

Specifically, if a game competition is broadcast live, information on game props of multiple anchors participating in the competition can be acquired, and corresponding identification codes can be generated. It is also possible to generate one identification code according to information on game props of all the anchors.

The identification code may be in the form of a two-dimensional code, a barcode, or the like.

Further, on the page for displaying information on game props, an entrance for purchasing props can also be provided. The audience can operate the client terminal corresponding to the transaction platform to purchase props. That is, the page may include the introduction information of the game props, and may also include the purchase information of the props.

In Step 202, the transaction platform transmits the identification code to the live broadcast platform, so as to cause the live broadcast platform to display the identification code in the live broadcast screen.

In the practical application, the transaction platform transmits the generated identification code to the live broadcast platform. The transaction platform and the live broadcast platform can be connected with each other through the network. The transaction platform and the live broadcast platform can be composed of multiple electronic devices respectively.

The transaction platform may also transmit an anchor identification or live broadcast identification corresponding to the identification code together with the identification code to the live broadcast platform. For example, if the display page corresponding to the identification code includes information on game props used by anchor A, the transaction platform can transmit the identification code and "A" to the live broadcast platform. For another example, if the display page corresponding to the identification code includes information on game props used by each anchor in a live broadcast competition, the transaction platform may transmit the identification code and a corresponding live broadcast competition identification to the live broadcast platform.

Specifically, after receiving the identification code, the live broadcast platform can display the identification code in the live broadcast screen. Thus, during watching the live broadcast, the audience can scan the identification code to browse information on the props used by the anchor in the process of the live broadcast.

Further, the live broadcast platform may determine the identification code corresponding to the live broadcast screen according to the anchor identification or the live broadcast identification, and then embed the corresponding identification code into the live broadcast screen. For example, the identification code may be displayed at the lower end of the live broadcast screen, and the identification code may also be displayed at any corner of the live broadcast screen.

In practical application, the audience can open the client corresponding to the transaction platform in the terminal, and use the client to scan the identification code, so that the terminal can obtain a page corresponding to the identification code for displaying information on game props.

The method provided in the embodiment is used to acquire prop information, and the method is executed by a device provided with the method provided in the embodiment, and the device is usually implemented in hardware and/or software.

The method for acquiring prop information provided by the embodiment includes: receiving, by the transaction platform, information on game props during the live game broadcast, and generating the identification code for accessing the information on game props; transmitting, by the transaction platform, the identification code to the live broadcast platform, so as to cause the live broadcast platform to display the identification code in the live broadcast screen. In the method for acquiring prop information provided by the embodiment, the identification code for displaying information on game props is added to the live broadcast screen. Therefore, while watching the live broadcast, the audience can obtain information on game props used in the live broadcast process of the game by scanning the identification code, which is easy for the user to operate.

Figure 3:
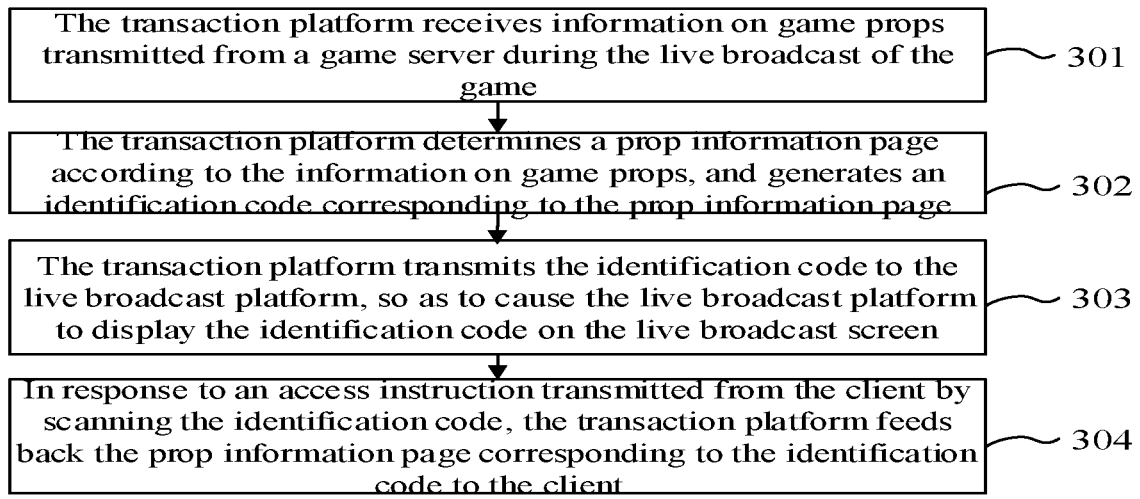
FIG. 3 is a flowchart of a method for acquiring prop information according to some embodiments of the present disclosure.

FIG. 3 is a flowchart of a method for acquiring prop information according to some embodiments of the present disclosure.

As shown in FIG. 3, the method for acquiring prop information provided by the embodiments includes steps described below.

In Step 301, the transaction platform receives information on game props transmitted from a game server during the live broadcast of the game.

In the method provided by the embodiment, during the live broadcast of the game, the game server acquires information on game props used by the anchor. Specifically, the information on game props of the anchor participating in the live broadcast may be obtained according to the game account of the anchor.

Specifically, for example, when multiple anchors participate in a live broadcast competition of a game, the live broadcast platform can acquire the account information of these anchors in advance, and then determine the game account information of each anchor according to the corresponding relationship between the game account and the live broadcast account. The live broadcast platform can transmit the game account information of the anchor participating in the live broadcast to the game server, so that the game server can acquire corresponding information on game props.

Further, the game server may package the acquired information on game props, and then transmit it to the transaction platform. For example, the game server can package information on props used by one anchor, and transmit it to the transaction platform. Alternatively, the game server can package information on props used by each anchor in the game competition together, and then transmit the packaged data to the transaction platform.

In Step 302, the transaction platform determines a prop information page according to the information on game props, and generates an identification code corresponding to the prop information page.

Specifically, after receiving the information on game props, the transaction platform can aggregate the game props according to the information, and generate a page including the information of theses game props. For example, a landing page can be generated, when the page is opened, the information on game props can be displayed, and the information on the props can include, for example, a name of the prop, a selling price, an introduction of the prop, and so on.

Further, the transaction platform can also determine tradable props among the game props according to the information on game props, and generate the prop information page according to the information on the tradable props.

In practical application, the generated prop information page may also include transaction information of the game props, such as selling price. Users can directly operate on this page to purchase required game props. In this case, when generating the prop information page, the transaction platform can screen out the information on game props, so as to generate a page including only information on the tradable props, thereby preventing users from being unable to operate game props on the page.

The transaction information of each game prop (for example, whether the prop is tradable or not) can be recorded in the transaction platform. For example, a database of prop information can be maintained, and each prop can have a prop identifier, and the prop identifier is associated with the relevant information of the prop, such as whether the prop can be traded, and the price of the prop. The transaction platform can check whether the game prop can be traded according to the identifier of the game prop. If the prop can be traded, the transaction platform will determined the prop as a tradable prop.

Specifically, after generating the prop information page, the transaction platform may also generate an identification code corresponding to the prop information page. The information of the identification code includes an access path of the prop information page. Therefore, the corresponding prop information page can be opened according to the identification code.

Further, the prop information page may be a web page, for example a landing page. Therefore, the page has an access path through which the page can be accessed. The access path can be, for example, a website address.

In practical application, the identification code can be generated according to the access path of the prop information page, for example, a two-dimensional code or a barcode can be generated. The identification code graphics can be determined according to the access path, for example, operations such as encryption and graphics conversion can be performed on the access path to obtain the identification code.

In Step 303, the transaction platform transmits the identification code to the live broadcast platform, so as to cause the live broadcast platform to display the identification code in the live broadcast screen.

The specific principles and implementation manners of step 303 are similar to those of step 202, and are not repeated here.

In Step 304, in response to an access instruction transmitted from the client by scanning the identification code, the transaction platform feeds back the prop information page corresponding to the identification code to the client.

Since the live broadcast platform adds the identification code to the live broadcast screen, the user will see the live broadcast screen including the identification code when watching the live broadcast or playback of the game.

Specifically, the user can open the client corresponding to the transaction platform in the user terminal, and use the user terminal to scan the identification code in the live broadcast screen, so that the user terminal can open the prop information page corresponding to the identification code.

For example, if the identification code corresponding to the prop used by anchor A is displayed on the live broadcast screen, the information on the prop used by anchor A can be browsed by using the client to scan the identification code. If the identification code corresponding to the information on props used by each anchor in the live game is displayed on the live broadcast screen, the information on props used by each anchor in the live game can be browsed by using the client to scan the identification code.

Specifically, when the user uses the client to scan the identification code, the information included in the identification code can be parsed, specifically, an access path corresponding to a prop information page can be parsed, and an access instruction can be sent to the transaction platform according to the access path.

Further, if the access path is path1, the client can access path1 to transmit an access instruction to the transaction platform. The transaction platform can determine the prop information page corresponding to the identification code according to the access path, and feed back the prop information page to the client. For example, the transaction platform can transmit the prop information page corresponding to path1 to the client.

In practical application, the prop information page may include transaction information of game props, such as selling price, etc., and users can also directly operate on an opened page to purchase corresponding prop.

In the method for acquiring prop information provided in the embodiment, the transaction platform receives the information on game props during the live broadcast of the game, generates a page including the information on game props, and generates an identification code according to the access path of the page; the transaction platform transmits the identification code to the live broadcast platform, so that the live broadcast platform displays the identification code in the live broadcast screen. Therefore, when watching the live video, the audience can directly scan the two-dimensional code through the terminal, and then quickly acquire the prop information used in the live broadcast process of the game, which is convenient for users to operate. When the page includes the transaction information of the prop, the user can also directly operate on the page and purchase the prop without searching.

Figure 4:
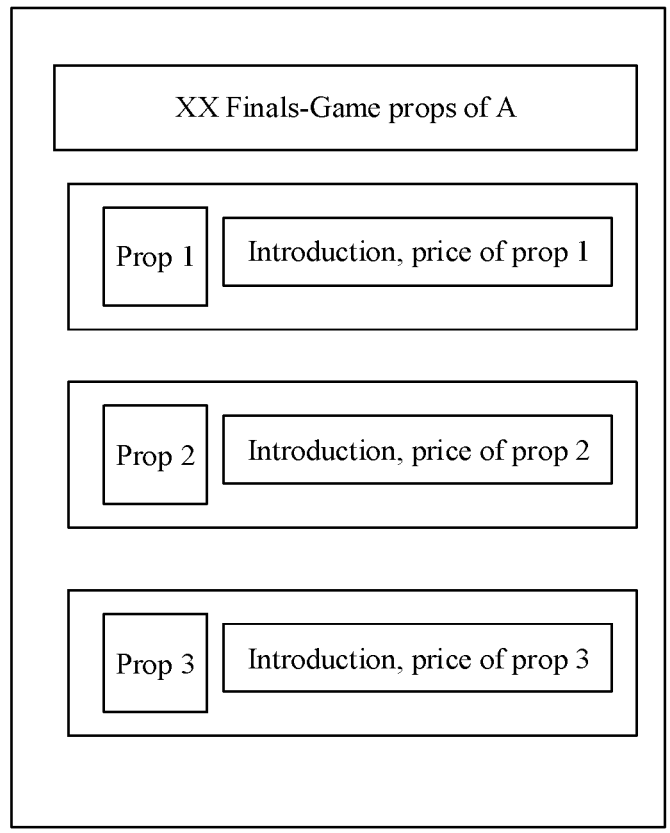
FIG. 4 is a schematic diagram illustrating a prop information page according to some embodiments of the present disclosure.

FIG. 4 is a schematic diagram illustrating a prop information page according to an exemplary embodiment of the present disclosure.

As shown in FIG. 4, by scanning the identification code in the live broadcast screen, the user terminal can display an information page of the props used by anchor A during the live broadcast, so that the audience can easily learn about the game props used by the anchor during the live broadcast.

Figure 5:
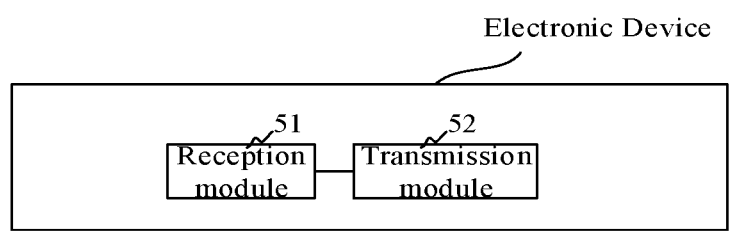
FIG. 5 is a structural diagram illustrating an electronic device according to some embodiments of the present disclosure.

FIG. 5 is a structural diagram illustrating an electronic device according to an exemplary embodiment of the present disclosure.

As shown in FIG. 5, the electronic device provided by the embodiment includes:

a reception module 51, configured to receive information on game props during a live broadcast of the game, and generate an identification code for accessing the information on game props;

a transmission module 52, configured to transmit the identification code to the live broadcast platform, so as to cause the live broadcast platform to display the identification code in the live broadcast screen.

The electronic device provided by the embodiment includes: a reception module, configured to receive information on game props during a live broadcast of the game, and generate an identification code for accessing the information on game props; a transmission module, configured to transmit the identification code to the live broadcast platform, so as to cause the live broadcast platform to display the identification code in the live broadcast screen. In the electronic device provided by the embodiment, the identification code for displaying information on game props is added to the live broadcast screen. Therefore, while watching the live broadcast, the audience can obtain information on game props used in the live broadcast process of the game by scanning the identification code, which is easy for the user to operate.

The specific principles and implementation manners of the electronic device provided in the embodiment are similar to the embodiment shown in FIG. 2, and details are not described herein again.

Figure 6:
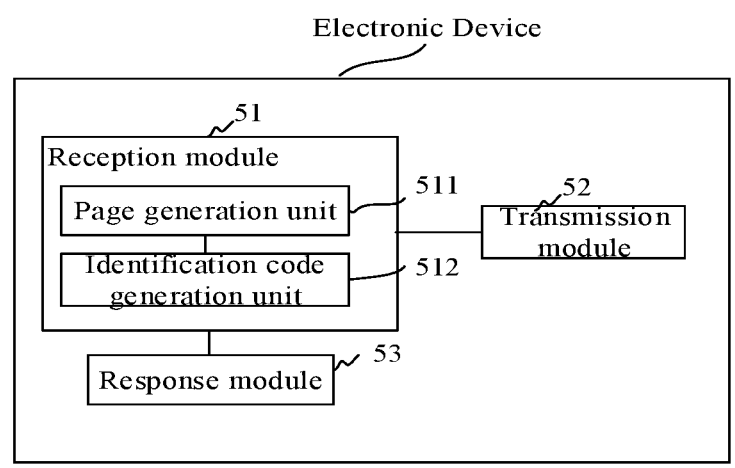
FIG. 6 is a structural diagram illustrating an electronic device according to some embodiments of the present disclosure.

FIG. 6 is a structural diagram illustrating an electronic device according to another exemplary embodiment of the present disclosure.

As shown in FIG. 6, on the basis of the foregoing embodiment, in the electronic device provided in the embodiment, the information on game props is acquired through the game server.

Correspondingly, the reception module 51 is further configured to receive the information on game props sent from the game server during the live broadcast of the game.

In some embodiments, the reception module 51 includes:
a page generation unit 511, configured to determine a prop information page according to the information on game props; and
an identification code generation unit 512, configured to generate an identification code corresponding to the prop information page;
where the information of the identification code includes an access path of the prop information page.

Optionally, the page generation unit 511 is further configured to:
determine tradable props in the game props according to the information on game props; and
generate the prop information page according to the information on the tradable props.

In some embodiments, the device further includes a response module 53, configured to:
in response to an access instruction transmitted from the client by scanning the identification code, feed back the prop information page corresponding to the identification code to the client.

In some embodiments, the prop information page includes transaction information of the game props.

The specific principles and implementation manners of the electronic device provided in the embodiment are similar to the embodiment shown in FIG. 3, and details are not described herein again.

Figure 7:
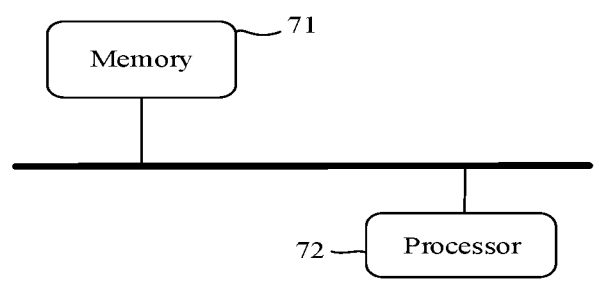
FIG. 7 is a structural diagram illustrating an electronic device according to some embodiments of the present disclosure.

FIG. 7 is a structural diagram illustrating an electronic device according to an exemplary embodiment of the present disclosure.

As shown in FIG. 7, the electronic device provided in the embodiment includes:
a memory 71;
a processor 72; and
computer programs;
where the computer programs are stored in the memory 71, and configured to be executed by the processor 72 to implement any of the above-mentioned methods for acquiring prop information.

The embodiments also provide a computer-readable storage medium with a computer program stored thereon,
the computer program is executed by a processor to implement any of the above-mentioned methods for acquiring prop information.

The embodiments also provide a computer program including program code that, when running on a computer, executes any of the above-mentioned methods for acquiring prop information.

Those ordinary skilled in the art can understand that all or part of the steps of implementing the above method embodiments may be completed by hardware related to program instructions. The aforementioned program can be stored in a computer-readable storage medium. When the program is executed, steps including the above method embodiments are executed; and the aforementioned storage medium includes: ROM, RAM, magnetic disk or optical disk and other media that can store program codes.

Finally, it should be noted that the above embodiments are only used to illustrate the technical solutions of the present disclosure, but not to limit them. Although the present disclosure has been described in detail with reference to the foregoing embodiments, those ordinary skilled in the art should understand that, the technical solutions described in the foregoing embodiments can still be modified, or some or all of the technical features thereof can be equivalently replaced; and these modifications or replacements do not make the essence of the corresponding technical solutions depart from the scope of the technical solutions of the embodiments of the present disclosure.

What is claimed is:

1. A method for acquiring prop information, applied to a system for acquiring prop information, comprising:
   receiving a plurality of game account identifiers of a plurality of anchors participating in a single live broadcast of a game, wherein the plurality of game account identifiers are determined based on relationships between the plurality of game account identifiers and a plurality of live broadcast accounts corresponding to the single live broadcast;
   transmitting the plurality of game account identifiers to a game server corresponding to the game;
   responsive to transmitting the plurality of game account identifiers, receiving, by a transaction platform, information on game props of the plurality of anchors sent by the game server during the single live broadcast of the game, wherein the system for acquiring the prop information comprises the game server, the transaction platform and a plurality of clients, and each anchor plays the game through a different client, and wherein the game server determines the game props based on login accounts of the plurality of anchors used to access the game server;
   generating, by the transaction platform, one or more pages including the information on the game props, comprising searching a database of the transaction platform based on a prop identifier of a first prop of the game props of the plurality of anchors to determine whether the first prop is able to be traded in the game;
   generating, by the transaction platform, a first identification code for accessing the one or more pages including the information on the game props according to the information on the game props of the plurality of anchors, wherein the first identification code is a two-dimensional scannable code;
   transmitting, by the transaction platform, the first identification code and an anchor identification corresponding to at least one anchor of the plurality of anchors to a live broadcast platform, wherein the live broadcast platform determines a first live broadcast screen, of a plurality of live broadcast screens, corresponding to the anchor identification and embeds the first identification code into the first live broadcast screen at a predefined position in the first live broadcast screen, wherein each anchor of the plurality of anchors has an associated live broadcast screens of the plurality of live broadcast streams, such that the first live broadcast screen with the first identification code is displayed, and the information on the game props of the anchor is acquired by scanning the first identification code;
   receiving, from a user terminal of a user watching the single live broadcast, an access request according to an access path, wherein the access request is generated based on the user using the user terminal to scan the first identification code embedded with the first live broadcast screen;
   transmitting, by the transaction platform and in response to the access request, the one or more pages including the information on the game props;
   receiving, from the user terminal, an operation to purchase the first prop on the one or more pages; and
   completing purchase of the first prop for the user without the user searching for the first prop.

2. The method according to claim 1, wherein the information on game props is acquired through a game server; the receiving, by a transaction platform, information on game props during a live broadcast of a game comprises:
   receiving, by the transaction platform, the information on game props transmitted from the game server during the live broadcast of the game.

3. The method according to claim 1, wherein the generating the first identification code for accessing the information on game props according to the information on game props comprises:
   determining a prop information page according to the information on game props, and generating the first identification code corresponding to the prop information page; and
   wherein information of the first identification code comprises the access path and the access path is of the prop information page.

4. The method according to claim 3, wherein the determining the prop information page according to the information on game props comprises:
   determining tradable props in the game props according to the information on game props; and
   generating the prop information page according to information on the tradable props.

5. The method according to claim 4, wherein the prop information page comprises transaction information of the game props, the transaction information of each game prop comprises information that the game prop is tradable or non-tradable; each game prop has a prop identifier, and the transaction information of the game prop is associated with the prop identifier of the game prop;
   wherein the determining the tradable props in the game props according to the information on game props comprises:
   querying whether the game prop is tradable according to the prop identifier of the game prop; and
   determining, in response to determining that the game prop is tradable, the game prop as the tradable prop.

6. The method according to claim 3, wherein the prop information page comprises transaction information of the game props.

7. An electronic device, applied to a system for acquiring prop information, comprising a processor and a memory for storing a computer program, wherein the processor is configured to call and run the computer program stored in the memory to perform operations of:
   receiving an account identifier of an anchor participating in a live broadcast of a game;
   responsive to receiving the account identifier, transmitting the account identifier to a game server corresponding to the game;
   responsive to transmitting the account identifier, receiving, by a transaction platform, information on game props of the anchor sent by the game server during the live broadcast of the game, wherein the system for acquiring the prop information comprises the game server, the transaction platform and a plurality of clients, and each anchor plays the game through a different client,
   generating, by the transaction platform, a first identification code for accessing the information on the game props according to the information on the game props of the anchor, wherein the first identification code is a two-dimensional scannable code; and transmitting, by the transaction platform, the first identification code and an anchor identification corresponding to the anchor to a live broadcast platform, wherein the live broadcast platform determines a first live broadcast screen, of a plurality of live broadcast screens, corresponding to the anchor identification and embeds the first identification code into the first live broadcast screen at a predefined position in the first live broadcast screen, wherein each anchor of a plurality of anchors has an associated live broadcast stream of the plurality of live broadcast screens, such that the first live broadcast screen with the first identification code is displayed, and the information on the game props of the anchor is acquired by scanning the first identification code.

8. The electronic device according to claim 7, wherein the information on game props is acquired through a game server; and wherein the processor is further configured to receive the information on game props transmitted from the game server during the live broadcast of the game.

9. The electronic device according to claim 7, wherein the processer is further configured to:

determine a prop information page according to the information on game props, and generate the first identification code corresponding to the prop information page;

wherein information of the first identification code comprises an access path of the prop information page.

10. The electronic device according to claim 9, wherein the processor is further configured to:

determine tradable props in the game props according to the information on game props; and generate the prop information page according to information on the tradable props.

11. The electronic device according to claim 9, wherein the processor is further configured to:

in response to an access instruction transmitted from a client by scanning the first identification code, feed back the prop information page corresponding to the first identification code to the client.

12. The electronic device according to claim 9, wherein the prop information page comprises transaction information of the game props.

13. A non-transitory computer-readable storage medium having computer programs stored thereon, applied to a system for acquiring prop information, wherein the computer programs are executed by a processor to implement operations of:

receiving an account identifier of an anchor participating in a live broadcast of a game:

responsive to receiving the account identifier, transmitting the account identifier to a game server corresponding to the game;

responsive to transmitting the account identifier, receiving, by a transaction platform, information on game props of the anchor sent by the game server during the live broadcast of the game, wherein the system for acquiring the prop information comprises the game server, the transaction platform and a plurality of clients, and each anchor plays the game through a different client, generating, by the transaction platform, a first identification code for accessing the information on the game props according to the information on the game props of the anchor, wherein the first identification code is a two-dimensional scannable code; and transmitting, by the transaction platform, the first identification code and an anchor identification corresponding to the anchor to a live broadcast platform, wherein the live broadcast platform determines a first live broadcast screen, of a plurality of live broadcast screens, corresponding to the anchor identification and embeds the first identification code into the first live broadcast screen at a predefined position in the first live broadcast screen, wherein each anchor of a plurality of anchors has an associated live broadcast screen of the plurality of live broadcast screens, such that the first live broadcast screen with the first identification code is displayed, and the information on the game props of the anchor is acquired by scanning the first identification code.

14. The storage medium according to claim 13, wherein the information on game props is acquired through a game server;

the receiving, by a transaction platform, information on game props during a live broadcast of a game comprises:

receiving, by the transaction platform, the information on game props transmitted from the game server during the live broadcast of the game.

15. The non-transitory computer-readable storage medium according to claim 13, wherein the generating the first identification code for accessing the information on game props according to the information on game props comprises:

determining a prop information page according to the information on game props, and generating the first identification code corresponding to the prop information page; and wherein information of the first identification code comprises an access path of the prop information page.

16. The non-transitory computer-readable storage medium according to claim 15, wherein the determining the prop information page according to the information on game props comprises:

determining tradable props in the game props according to the information on game props; and generating the prop information page according to information on the tradable props.

17. The non-transitory computer-readable storage medium according to claim 15, further comprising:

in response to an access instruction transmitted from a client by scanning the first identification code, feeding back, by the transaction platform, the prop information page corresponding to the first identification code to the client.

18. The non-transitory computer-readable storage medium according to claim 15, wherein the prop information page comprises transaction information of the game props.

\* \* \* \* \*